United States Patent
Friedman et al.

[15] 3,657,511
[45] Apr. 18, 1972

[54] AUTOMATIC WELDING SYSTEM

[72] Inventors: Robert Friedman, Reseda; Howard D. Lesher, Canoga Park; Richard K. Burley, Reseda, all of Calif.

[73] Assignee: North American Aviation, Inc.

[22] Filed: Apr. 5, 1967

[21] Appl. No.: 628,743

[52] U.S. Cl..............................219/125, 219/132, 250/215, 250/235, 340/190
[51] Int. Cl...............................................B23k 9/12
[58] Field of Search...........................219/124–126, 131, 219/132, 124 PL; 318/20.100, 20.110, 20.155, 20.300; 235/151.1, 151.11; 250/202, 215, 222, 235; 340/190, 147; 228/7–9

[56] References Cited

UNITED STATES PATENTS

| | | | |
|---|---|---|---|
| 3,005,939 | 10/1961 | Fromer et al. | 318/20.105 X |
| 3,024,986 | 5/1959 | Strainese et al. | 340/190 X |
| 3,109,921 | 11/1963 | Anderson | 219/125 |
| 3,126,471 | 3/1964 | Nelson | 219/125 X |
| 3,150,624 | 9/1964 | Brems | 219/125 X |
| 3,267,251 | 8/1966 | Anderson | 219/125 |

*Primary Examiner*—J. V. Truhe
*Assistant Examiner*—L. A. Schutzman
*Attorney*—William R. Lane, Thomas S. MacDonald and Fredrick Hamann

[57] ABSTRACT

An automatic weld programming system is described which is particularly suited for arc welding and in which a plurality of photocells is moved across a program sheet positioned on a console screen. The sheet contains coded indicia which cause signals to be generated to automatically control various welding parameters and synchronize various welding operations to insure that the physical welding manipulations occur in a preselected order and at a programmed rate. In addition, auxiliary system controls are also programmed so that weld environment is precisely controlled before, during and after the welding operation.

22 Claims, 19 Drawing Figures

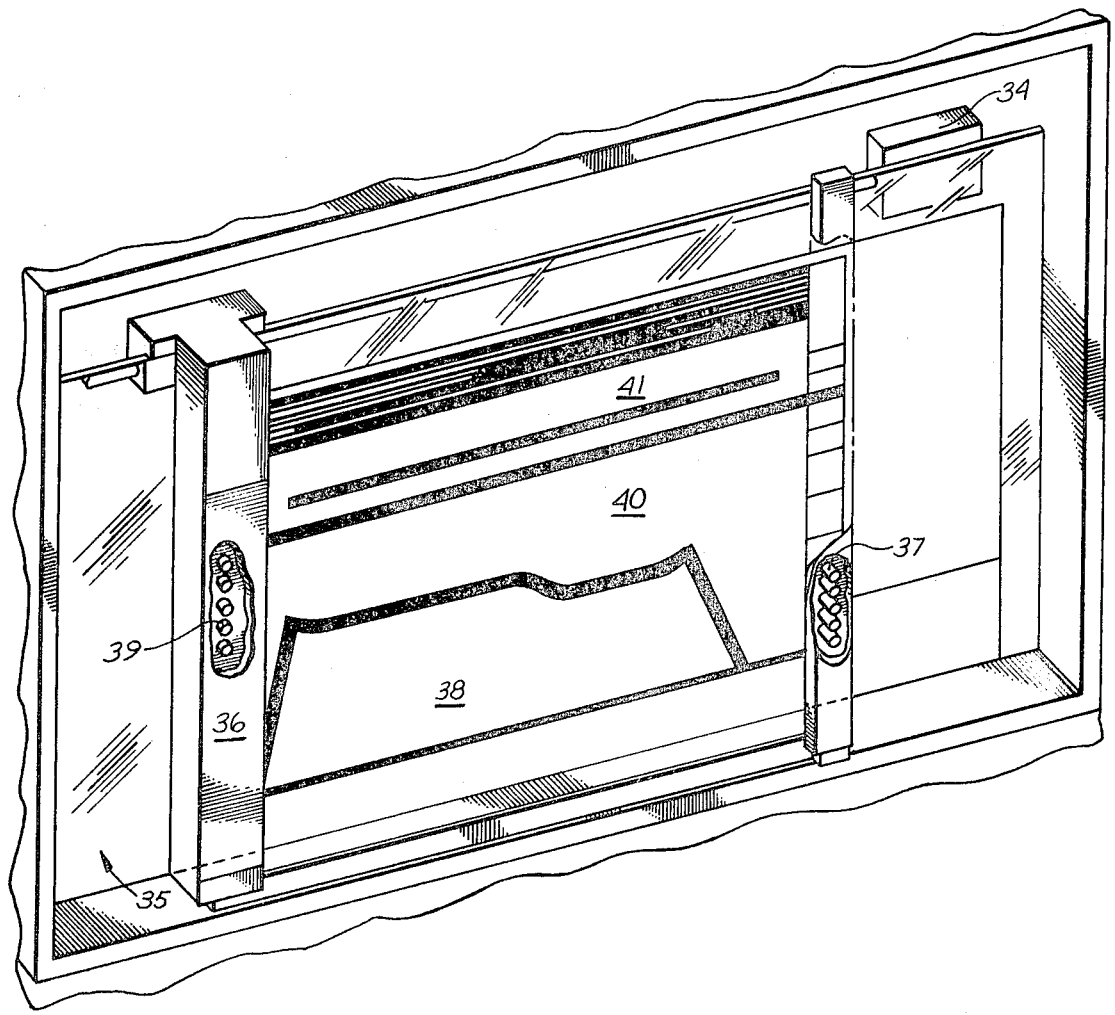

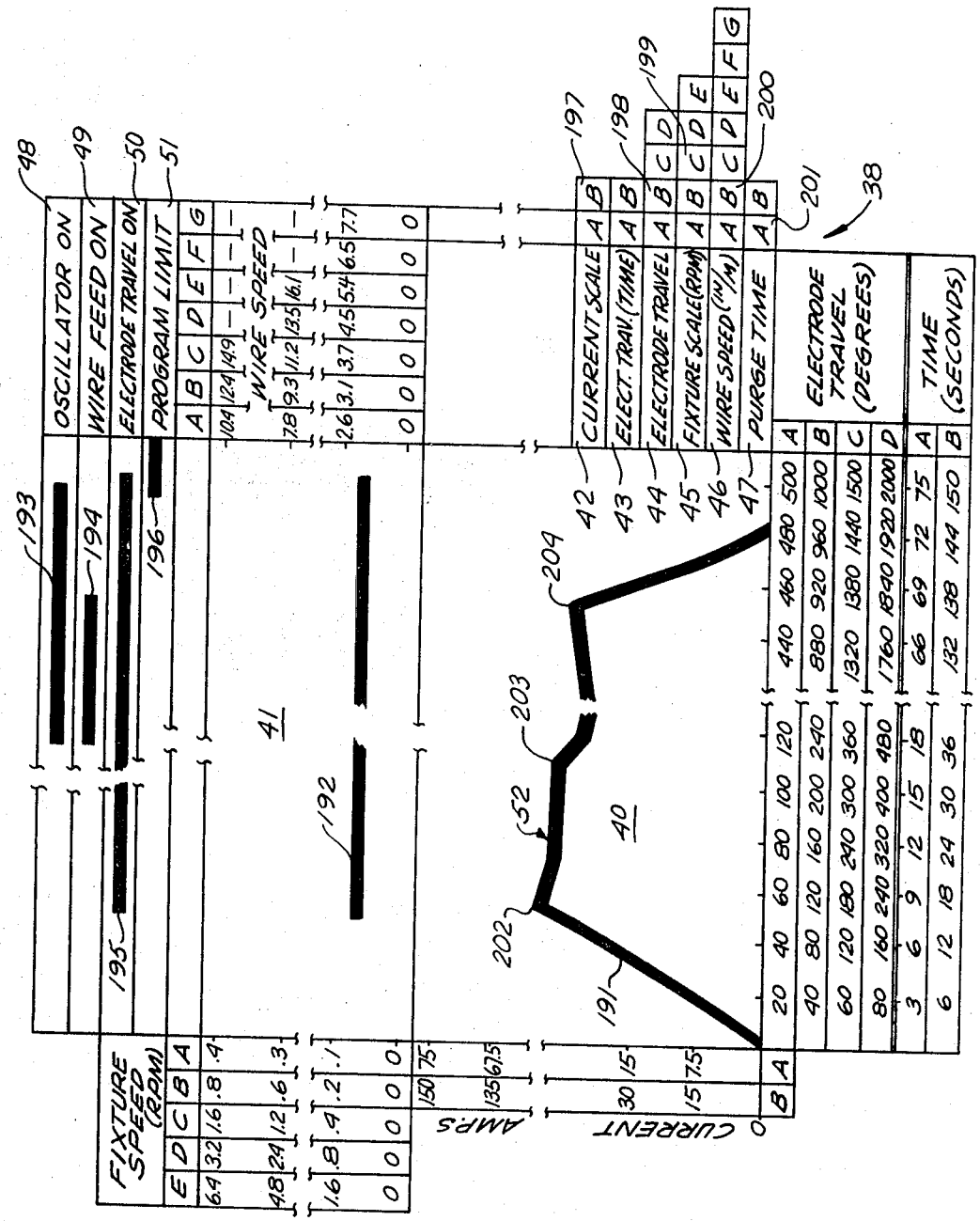

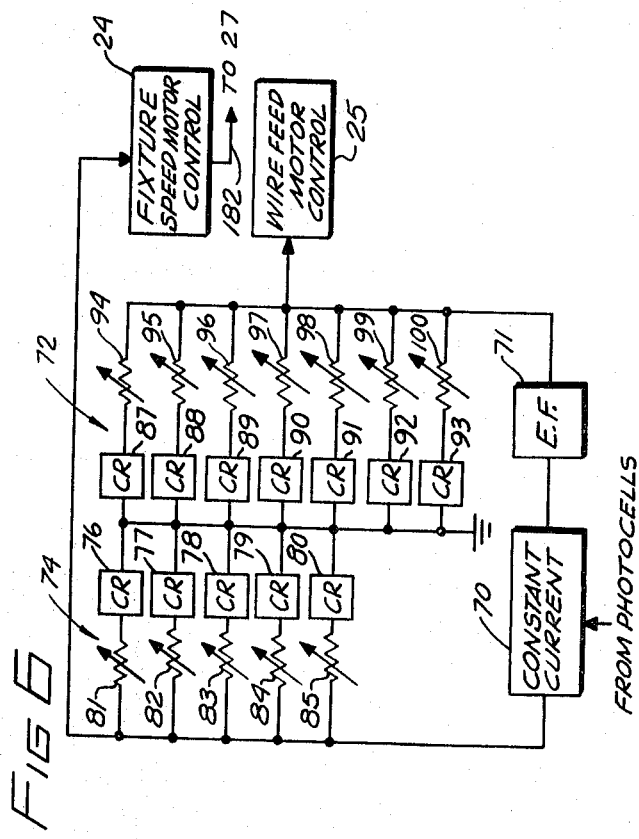

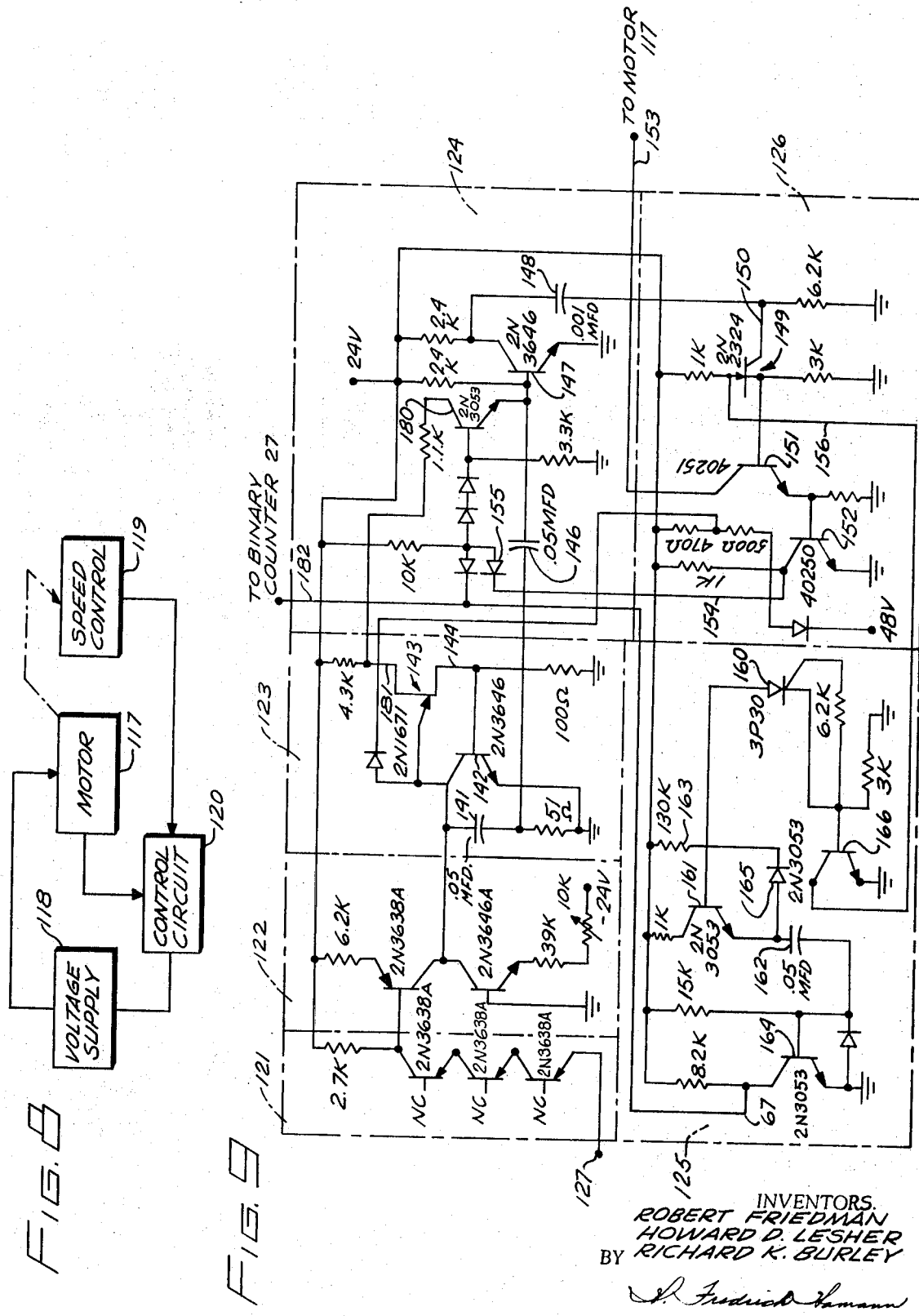

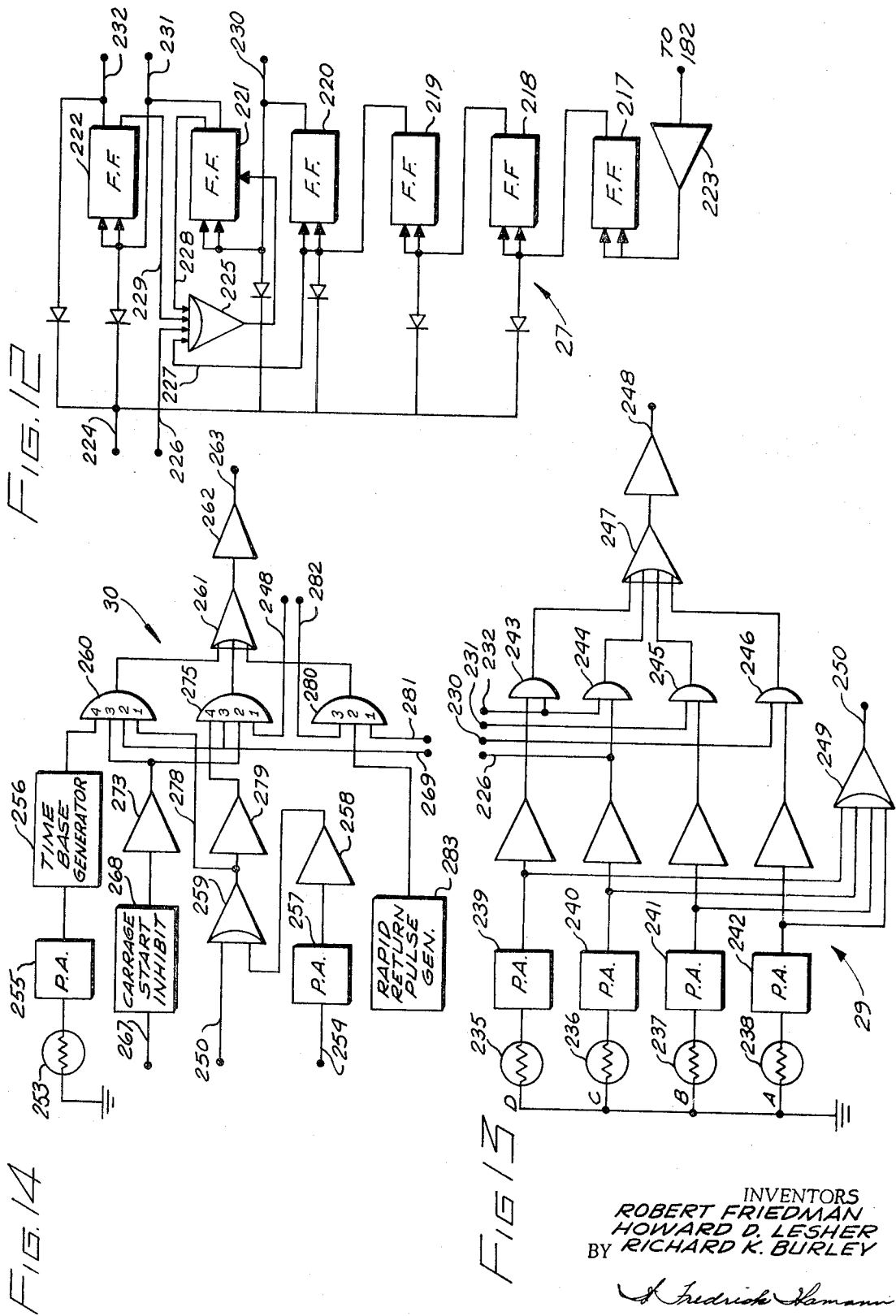

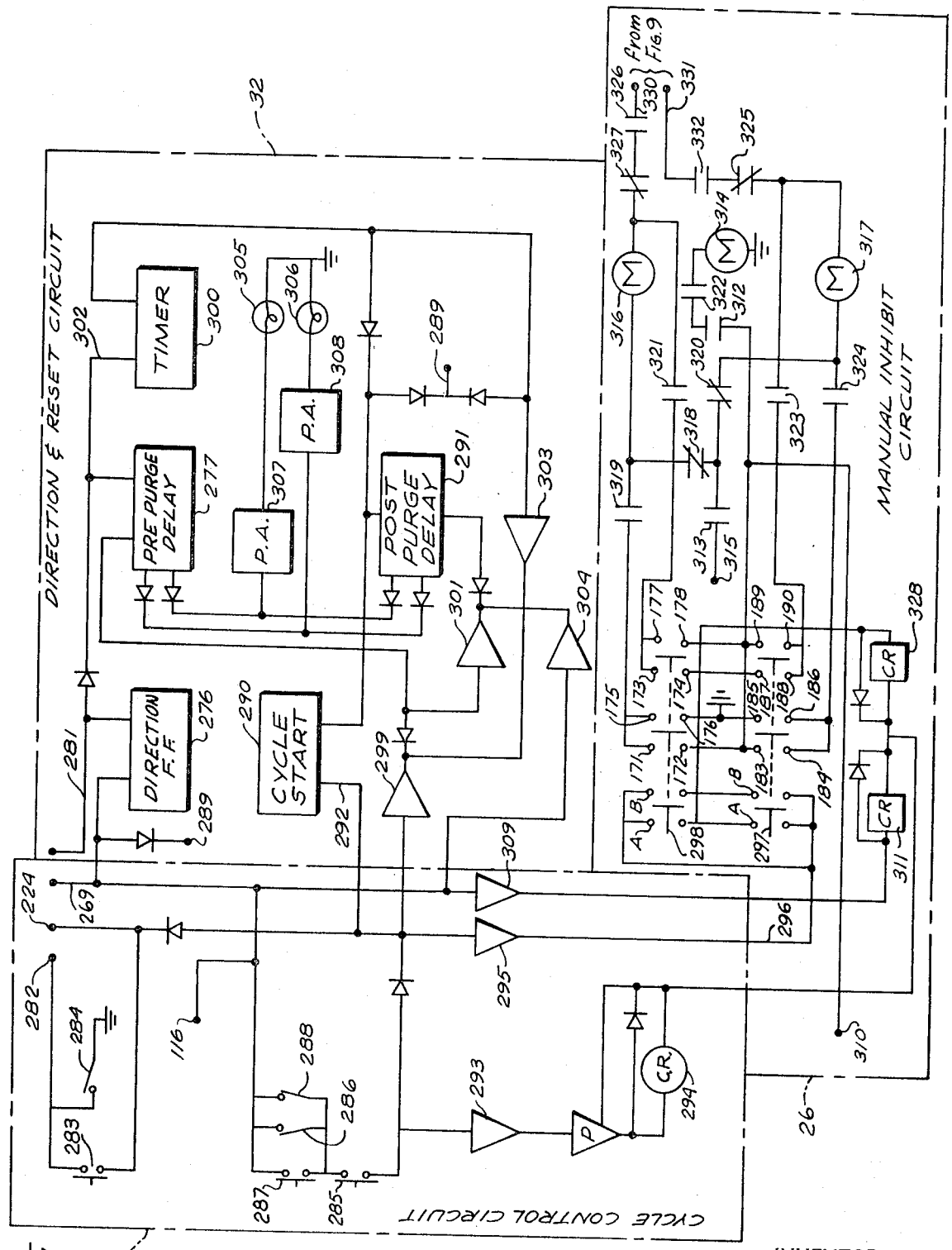

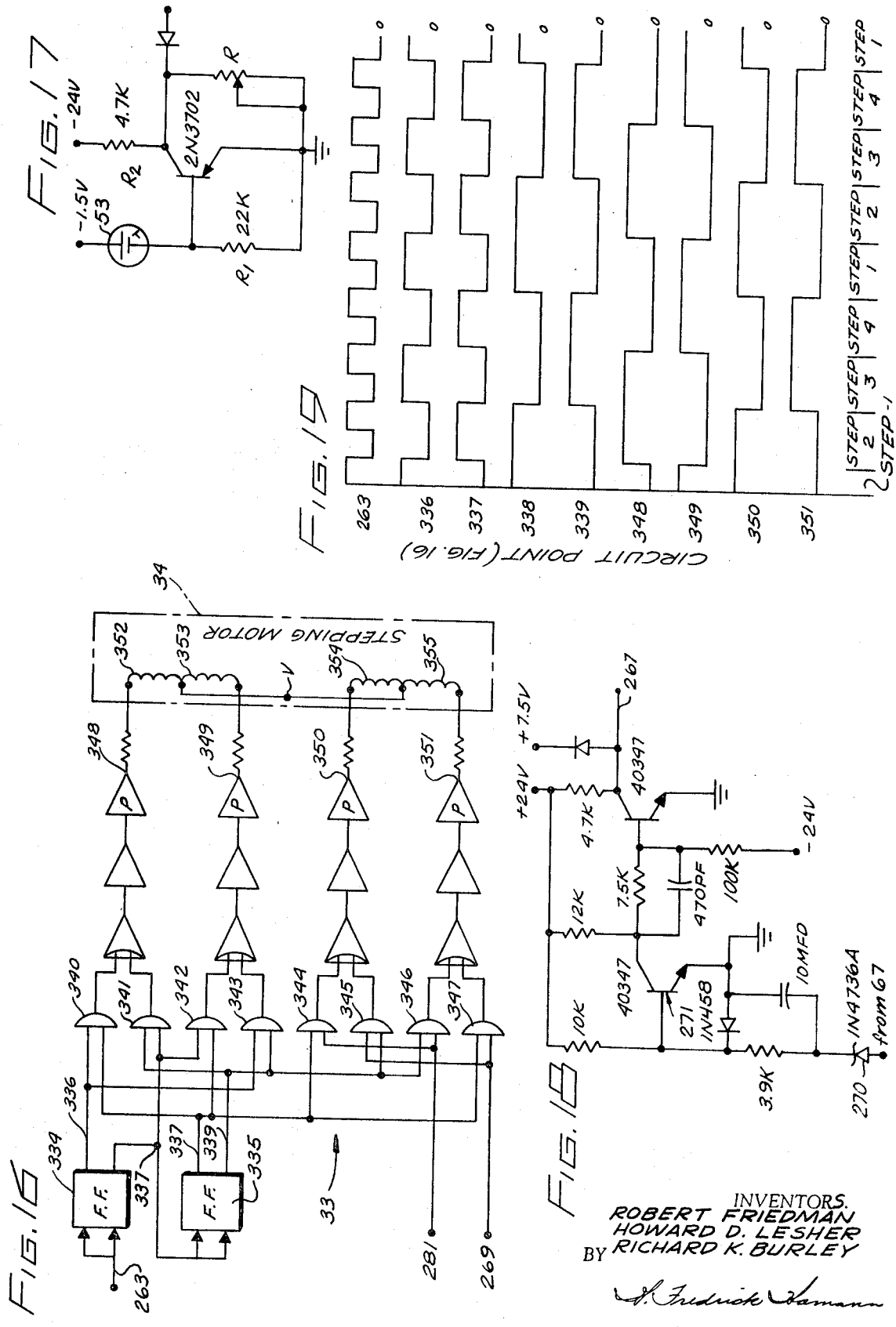

AUTOMATIC WELDING SYSTEM

The invention was made in the performance of work under a NASA contract and is subject to the provisions of the National Aeronautics and Space Act of 1958, Public Law 85–568 (72 Stat 426; 42 U.S.C. 2451) as amended.

BACKGROUND

The increasingly stringent requirements and specifications for weld control and precision, particularly in the aerospace field, have significantly expanded the need for automatic welding equipment in which variations due to human errors are eliminated. In addition, the need for consistent reproducibility of weld quality for a large variety of alloys requires that reliance upon human skill be minimized. However, such an automatic system must be relatively simple to operate so that semi-skilled technicians may utilize it without affecting the quality of the weld produced. Further, such a system must be sufficiently versatile to allow use in a variety of welding circumstances so that the cost of the welding operation is not significantly increased in proportion to the quality of the weld obtained. Prior art attempts to provide a solution to these problems have resulted in automatic curve followers which follow a graphic curve to control the path of a welder or other tool or welders in which only current and time sequences are programmed or in which path guidance is obtained directly from the work along with start and stop functions. However, these prior art devices are unable to provide precision programming of current level, weld material feed, weld fixture movement and arc voltage level, all synchronized with each other, synchronizing the weld program with the position of the arc, changing the program quickly, or providing weld reproducibility with essentially zero variations by elimination of human error.

SUMMARY OF INVENTION

The present invention, particularly adapted for use in controlling a welder, is directed to an automatic programmer utilizing a removable program monitored by a photocell scanner which generates a plurality of operation condition signals and a plurality of operating mode signals in response to the program. In the preferred embodiment a welding apparatus, including weld material feed, weld fixture moving device arc voltage control, and weld heat generating system, are responsive to operating mode signals to vary the material feed, fixture position, electrode position, and heating system operation in accordance with the program scanned. Additional synchronizing and scanning control devices are operable in response to the operating condition signals to insure that the scanner is moved in a prescribed manner and at a preselected speed. In this manner an analog programming system is provided in which the program may be easily modified to obviate errors in the program and which can be removed from the system and stored for later reuse when a weld on a similar structure or material is required. In addition, each reuse of the program will result in the controlled system operating in an identical manner with the previous use when the same materials are involved. Such a system may be utilized by semi-skilled technicians since no experience in operating the controlled system, e.g., welding, is necessary.

BRIEF DESCRIPTION OF THE DRAWINGS

FIG. 2 is a perspective view of the program and scanner utilized in FIG. 1.

FIG. 3 is a drawing of a representative program sheet of reduced size utilized in FIG. 2.

FIG. 4 is a circuit diagram of the weld current control of FIG. 1.

FIG. 5 is a schematic diagram of the welder of FIG. 1.

FIG. 6 is a circuit diagram of the motor regulator circuit of FIG. 1.

FIG. 7 is a schematic diagram of the "on-off" program circuit portion of the scanner of FIG. 1.

FIG. 8 is a schematic diagram of the motor controls of FIG. 1.

FIG. 9 is a circuit diagram of the control circuit of FIG. 8.

FIG. 12 is a schematic diagram of the binary counter of FIG. 1.

FIG. 13 is a schematic diagram of the electrode travel logic circuit of FIG. 1.

FIG. 14 is a schematic diagram of the time base logic circuit of FIG. 1.

FIG. 15 is a schematic diagram of the cycle control circuit, direction and reset circuit and manual inhibit circuits of FIG. 1.

FIG. 16 is a schematic diagram of the stepping motor logic circuit of FIG. 1.

FIG. 17 is a circuit diagram of the photocell amplifier-photovoltaic type utilized in the system of FIG. 1.

FIG. 18 is a circuit diagram of the carriage start inhibit circuit of FIG. 14.

FIG. 19 is a diagram of the pulse relationships at certain points of the stepping motor logic of FIG. 16.

DESCRIPTION OF PREFERRED EMBODIMENT

Figure 1:
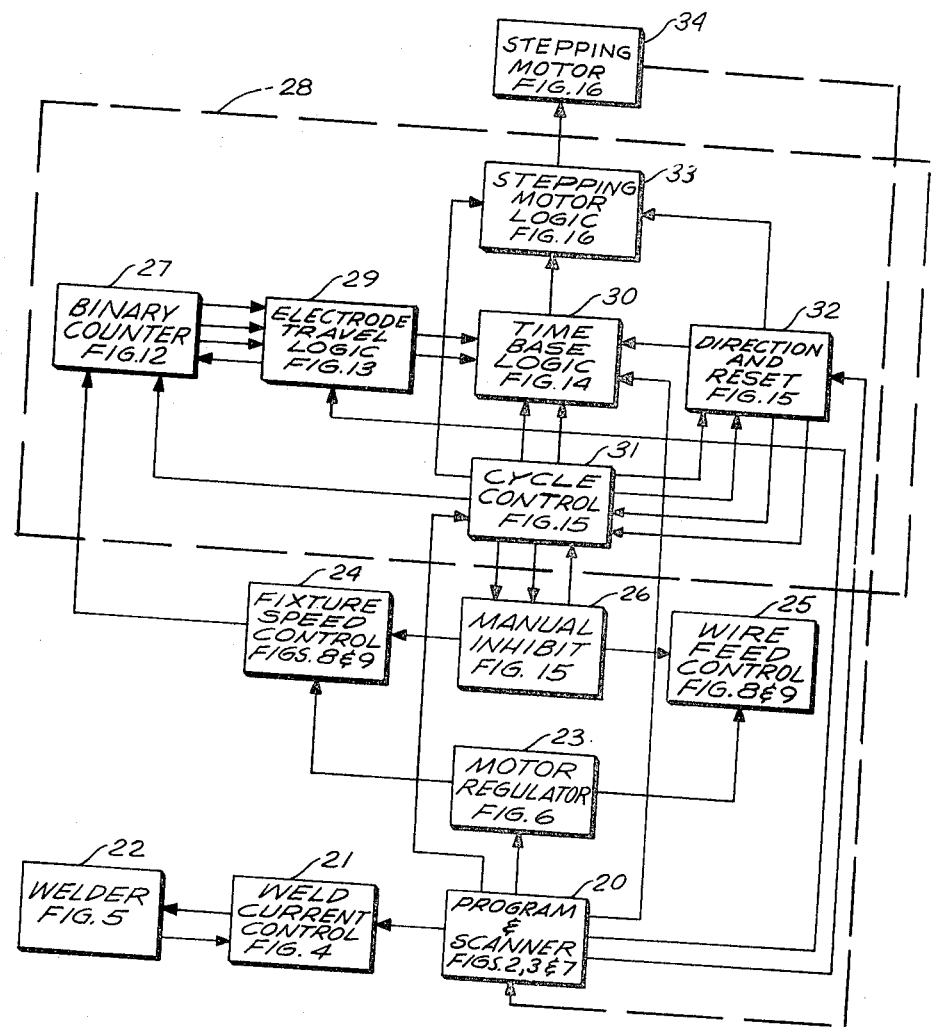
FIG. 1 is a schematic diagram of the system of the preferred embodiment of the present invention which illustrates the principles of the invention.

The system of the present invention is shown in schematic form in FIG. 1 and comprises a programming and associated scanning means, indicated generally at 20, which generates a plurality of signals a portion of which represent preselected operating conditions and another portion of which represent variable operating modes. In the specific embodiment described, i.e., an orbital arc welding system, the variable signals utilized are weld current control and motor control, the latter control regulating the fixture rotational speed control and wire feed control as functions of one another. The weld current control 21, shown in detail in FIG. 4, is responsive to one of these variable signals to regulate the arc current supplied to the welder, shown generally at 22 and in detail in FIG. 5. The motor regulator or decoder 23 (see FIG. 6) is also responsive to the variable signals from the programming and scanning means 20 to govern the fixture speed motor control 24 and wire feed motor control 25 (see FIGS. 8 and 9) so that welding fixture speed and wire feed speed are synchronized with weld current. Each of the motor controllers 24 and 25 is responsive to the manual control means 26 (see FIG. 15) so that wire feed and fixture speed may be manually controlled for testing, adjusting and emergency conditions. The fixture speed motor control 24 generates a chain of pulses which drives a binary counter circuit 27 (see FIG. 12). These pulses are utilized by the logic means 28 and synchronize the position of the arc welding electrode with the position of the scanning means relative to the program. The logic means 28 comprises the binary counter 27, electrode travel logic means 29 (see FIG. 13), time base logic means 30 (see FIG. 14), cycle control 31 and direction and reset control 32 (see FIG. 15) and stepping motor logic 33 (see FIG. 16). The electrode travel logic 29 is responsive to the counter 27 and to the program and scanner 20 to generate an output responsive to a preselected operating condition which defines the electrode travel scale in terms of degrees. The time base logic 30 is responsive to the output of the electrode travel logic 29 and to the program and scanner 20, to generate a signal representing a selection of the electrode travel base, i.e., degrees of rotation or seconds of time, to drive the stepping motor logic 33. The stepping motor logic 33 is responsive to the cycle control 31, to the direction control 32 and time base logic 30 to drive a stepping motor 34. The stepping motor 34 physically drives the scanner across the program as shown in FIG. 2.

The specific circuits shown diagrammatically in FIG. 1 will be described in detail with respect to FIGS. 2–19. The programming and scanning means 20 is shown in perspective view in FIG. 2 and comprises a transparent table 35, illuminated from beneath, upon which a removable Mylar sheet or program 38 is placed. The program 38 contains indicia, or has them removably attached to its surface, which indicia define the interrelationship of the variable parameters of the process being programmed. A carriage 36 carrying a plurality of indicia detectors, e.g., photocells, is adapted to move across the program and scan the indicia thereby monitoring the program. In addition, a plurality of fixed photocells 37 are responsive to indicia located on the right hand side of the program 38.

The Mylar sheet is shown in detail in FIG. 3 and comprises three main areas. The lower area 40 is adapted to carry a graphic representation, preferably by placing opaque tape in a configuration representing the desired variation in the welding current as a function of time or electrode travel. The upper graph area 41, located above the area 40, is adapted to carry a second such graphic representation of the desired interrelationship of the fixture speed and wire speed variations within the ranges A through E and A through G, shown on the left and right hand sides of area 41, respectively. The selection of the particular range is accomplished by introducing opaque indicia on one of the plurality of appropriate lettered squares in areas 45 and 46. Similar selections are made for other variables identified in areas 42 through 47 on the right hand side of the program 38. In addition, on-off control for fixture oscillation 48, wire feed 49, electrode travel 50 and program limit 51 are provided at the top of the program. Each of the graphic representations, the selection of ranges or the on-off control which may be specified on the program are selected by means of placing opaque tape in the proper position. The programmer 20 has a plurality of fixed photocells 37, one under each of the lettered squares on the program 38 adjacent areas 42–47, which sense whether the various indicia receiving squares have been covered. In response to the presence of these program indicia, as indicated by the monitoring scanner 20 or the fixed monitors 37, an appropriate signal is generated representing the programmed value of each of the operating parameters which control the operating conditions of the process. After the various program area indicia have been found to produce a satisfactory weld, a permanent copy may be made for future welding use. In this manner the operator would be unable to change the weld program and weld uniformity could not be affected. The carriage 36 of the scanning means 20 is composed of a vertical arm carrying 100 photocells which read the information from the lower area 40, forty additional photocells which scan area 41 of the program, and four photocells one of which scans each of the associated areas 48–51 for on-off control. While opaque tape and photocells are used in the preferred embodiment, other types of indicia and detectors may be used, for example, magnetic indicia and interacting detectors.

Photocell Amplifiers

The photocells used in detecting the program, represented by opaque tape 52, in areas 40 and 41 utilize photocell amplifiers particularly adapted for use with the voltaic type photocell. These units are shown in detail in FIG. 17 and have a −1.5 v. supply connected to the high side of photocell 53 so that upon exposure to light the current output turns on the transistor. This shunts the collector voltage on the transistor to ground and results in an output equal to zero. In the unit of FIG. 17 anytime the transistor is in a non-conducting state because no light is present on the photocell 53, the resistors $R_1$ and $R_2$ form a voltage divider. In the circuits in which these units are used, 100 for the scanner portion covering area 40, the output is connected through a diode to form an AND gate. In this manner the voltage appearing at the common connecting point 54 from the photocell array (see FIG. 4) will be the voltage output of the photocell having the greatest output. This is apparent if it is considered that if two photocells are turned on, i.e., illuminated, the voltage appearing on the common points will be the higher of the two outputs, since any output lower than the highest will cause the output diode to be reversed biased and therefore nonconducting. Thus, any number of these units may be connected in this manner and the output will be the highest voltage of the photocells which is not receiving light. As a result of this photocell arrangement, the program indicia, indicated generally at 52, used on the areas 40 and 41 need only be opaque tape a fraction of an inch wide, the configuration of which will define the relationship between the variables of the horizontal and vertical program axes for the particular program area.

Weld Current Control

The common point output 54 is connected to the weld current control 21 shown in detail in FIG. 4. The output 54 is connected to the input of a standard constant current circuit 55. This in effect ties the voltage at this point to the output of the photocell array. The load of the constant current circuit is a voltage divider circuit consisting of a pair of variable resistors 56 and 57 each connected in series with a control relay 58 and 59. The selection of which of the resistive values 56 or 57 is to be used is through the use of an opaque indicia covering one of the fixed photocell squares in area 42 of FIG. 3. This selection determines which of the current scales on the left side of area 40 is to be applicable during the particular program. The output 60 of the weld current control circuit is a voltage which is determined directly by the single photocell of the highest output circuit voltage which in turn is responsive to the location of the opaque programming tape in area 40.

Welder

The output 60 of the weld current control circuit is connected to the input of a welding means 22, comprising a closed loop control system, shown in more detail in FIG. 5, which generates an output which is a direct linear function of the input signal at 60. Since all elements of the welding means are standard, only the general arrangement will be discussed. The control loop comprises a weld current supply 61 having shunt 62 in series with the load. The current in the shunt is detected by a chopper 63, and amplified and subtracted from the input signal 60 by amplifier integrator 64 to generate an error voltage. The error voltage is then amplified and conditioned to properly drive an SCR circuit 65 which controls the power supply 61. More specifically, the chopper circuit 63 comprises a fixed frequency unitrode relaxation oscillator of standard design which drives a standard inverter. The output of the inverter drives a binary input to a standard flip flop circuit which in turn drives an emitter follower. The output of the emitter follower drives the chopper circuit which consists of a solid state device which switches the input to ground to a frequency fixed by the driving relaxation oscillator. The output of the chopper circuit 63 is a square wave signal having an amplitude directly proportional to the welding current being generated by supply 61. This square wave is fed into an LRC filter circuit which is tuned to pass only the fundamental frequency component of the square wave. This filtered signal drives a push-pull a.c. amplifier the output of which is demodulated to provide a d.c. signal proportional to current. This demodulated signal is subtracted algebraically from the command signal at input 60 to provide an error signal representing the difference between the desired current indicated on the program 38 and the actual current detected at the shunt 62. This signal drives a standard emitter follower isolation circuit which is connected to a differential input amplifier 66. The output of amplifier 66 drives a voltage level shift circuit of standard design which is used to bias the base of the unijunction transistor in the SCR firing circuit 65. The SCR firing circuit, which may also be standard, detects the conditioned error signal and controls the silicon controlled rectifier in the weld current supply 61. The weld current power supply 61 is standard and comprises primarily a full wave bridge with silicon controlled rectifier forming the positive voltage leg. When the SCR's are turned on, the conducting SCR remains conducting until the voltage across the element drops to zero. In this manner changing the firing angle will result in a corresponding change in the current to the load.

In the case of an arc welding operation it is essential that the arc be started and after start be maintained in a stable manner.

The arc starter 67 may be a standard circuit utilizing a combination of a high frequency circuit and a high voltage arc stabilizing circuit, the former initiating the arc and the latter heating the electrode and maintaining a residual current within the system. The starter 67 utilizes a diode bridge to monitor the open circuit voltage output of the supply 61. When that voltage reaches a prescribed range, e.g., 80–100 v., the arc is initiated. Once the arc is initiated the high frequency is turned off and the arc maintained by the high voltage arc stabilizing circuit 67. In this manner the welding arc is applied to the work 68 and the current utilized is controlled by the indicia in area 40 on the program 38 scanned by the photocells on the carriage 36.

Motor Regulator

The carriage also contains an additional series of forty photocells which are used to scan area 41 of the program 38. These photocells are connected in the same manner as discussed above. As a result the voltage output of the second array is the most negative of the cells which is not receiving light through the program sheet 38 because of the presence of opaque indicia 52. This voltage is fed to the collector of the input transistor of a standard constant current circuit 70 in the motor regulating circuit 23, shown in detail in FIG. 6. The load on the constant current circuit 70 is a transistor connected in an emitter follower arrangement 71 such that the base of the transistor is held at a constant level by circuit 70 and is set at a level such that the transistor remains conducting, as is well-known in the art. The output of the emitter follower 71 is connected through a voltage divider circuit, indicated generally at 72, to the wire feed motor control 25.

The constant current circuit 70 is also connected through a voltage divider circuit, indicated generally at 74, to the fixture speed motor control 24. The program 38 (see FIG. 3) provides an area 45 in which the fixture speed range may be selected by placing an opaque indicia over one of the appropriate squares A–E adjacent area 45. The precise ranges available for selection are shown at the left side of area 41 on program 38. Each of the squares A–E of area 45 has an associated fixed photocell which, when not exposed to light from the table 37, results in the closing of a control relay. The control relays 76–80 in FIG. 6 are associated with the fixed photocell areas A–E of area 45. One of the relays 76–80 is closed by the preselection of fixture speed range by placing an opaque indicia over an appropriate control condition defining square. This connects one of the variable resistors 81–85 between the output of the constant current circuit 70 and ground so that the voltage input from the photocells into circuit 70 is reflected as a variable current at the input of motor control 24.

In a similar manner the voltage divider circuit 72 is composed of seven relays 87–93 and seven variable resistors 94–100. The relays 87–93 are responsive to the placement of an opaque indicia in one of the seven squares A–G adjacent area 46 on the program 38 (see FIG. 3). The ranges of wire speed available are indicated at the right side of program area 41. The wire feed rate and fixture speed rate are clearly related since the faster the welding fixture is moved the faster the wire must be fed into the arc to accomplish the welding. Further, the speed of these two elements may require relative variation to accommodate changes in the thickness of the material to be welded. Thus, the ranges provided in each instance allow considerable discretion. It is clear that, if desired, the on-off program areas adjacent areas 48–51 on the program could be used to change the preselection from one range to another during operation if desired.

A plurality of individual scanning photocells 105–108 (see FIG. 7) are provided on the carriage 36, one each for each program area 48–51. Each resistive type photocell 105–108 has an associated amplifier 109–112 which has a high effective resistance. The amplifiers are of standard design and operation, and control the respective relay controls 113–115 for photocells 105–108, while the output 116 of the program limit photocell 108 associated with area 51 is connected to the cycle control circuit (see FIG. 11).

Thus, as the carriage 36 is moved across the face of the program 38 which is illuminated from beneath, the photocells 105–108 will generate signals in response to the presence of opaque indicia strategically placed in the various program areas 48–51. The cooperative operation of these individual scanning means with respect to the remainder of the circuits will be more apparent in the hereinafter described operation of the system.

Motor Control Circuits

Figure 10:
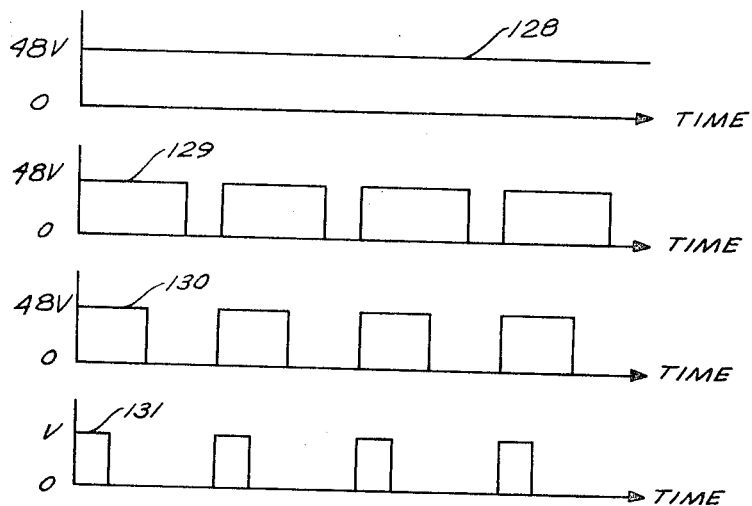
FIG. 10 is a series of voltage curves for the motor of FIG. 8.

Two separate motor control circuits 24 and 25 are used although they are identical in all essential respects. Such a circuit is shown in schematic form in FIG. 8 and in detail in FIG. 9. Each of the two motor control circuits 24 and 25 drive individual shunt wound motors 117 utilizing a 48 v. d.c. supply 118 in the preferred embodiment. Attached to the shaft of the motor is a slotted wheel which makes and breaks a light path to a photosensitive silicon controlled rectifier which is used to control the operating speed of the motor as shown diagrammatically at 119. The motor control circuit 120 is shown in detail in FIG. 9 and is composed of an input section 121, a constant current source 122, an unijunction pulse generator 123, an over-speed control circuit 124, a speed indicating circuit 125 and a motor drive stage 126. This system is of the switching mode variety in which a transistor switch is placed on the ground side of the motor and which drives the motor with pulses. Considering the motor and switch isolated from the rest of the circuit of FIG. 9 and assuming a source of appropriate motor driving pulses, when the transistor 143 is turned on the voltage drives the motor at maximum speed. FIG. 10 illustrates the voltage time relationships for various speeds. The longer the voltage is applied to the motor relative to the "off" period of the cycle, the faster the motor will travel. Curve 128 shows the application of the voltage supply output during the entire time and results in maximum motor speed. Curves 129, 130 and 131 show a decreasing time of voltage application and result in high, medium and low speed motor operation, respectively. Thus, the pulse width controls the motor speed.

In general the motor controls 24 and 25 maintain the speed of their respective motors at a constant rate regardless of the motor shaft load. Both underspeed and overspeed compensation is provided to permit a rapid return of the motor to the desired speed upon load changes.

Figure 11:
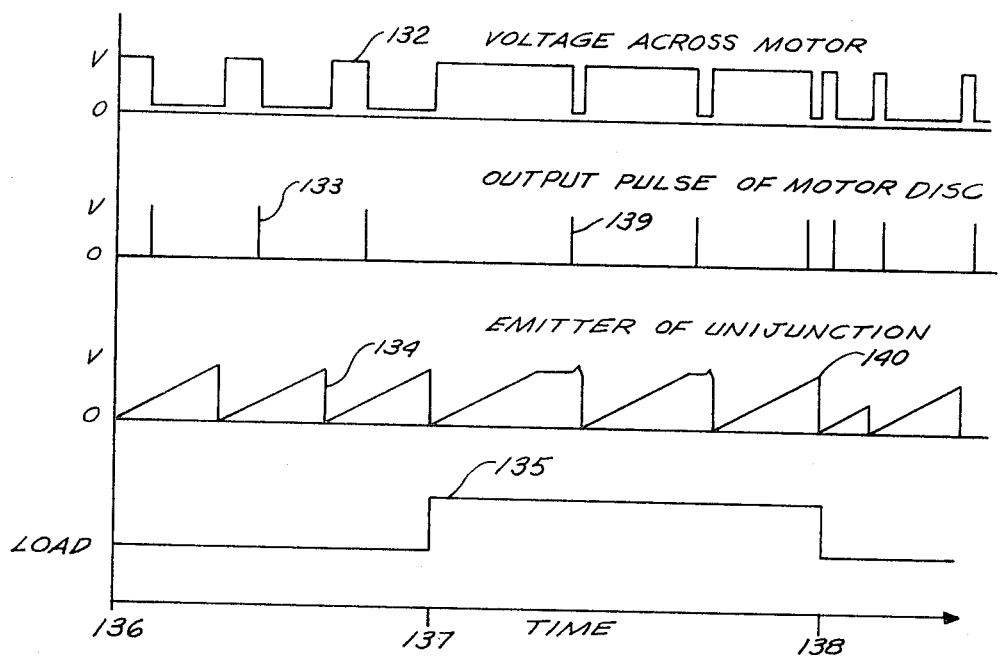
FIG. 11 is a series of curves showing the relationship of motor voltage and control signals of the circuit of FIG. 8.

FIG. 11 illustrates the voltage wave shapes of the motor voltage pulse curves 132, unijunction oscillator emitter voltage curves 134, the voltage output pulse 133 resulting from the operation of the slotted disc, and the change in load curve 135 causing the various changes in voltage. During the time illustrated between points 136 and 137 a standard speed operation is depicted. The motor is turned on at the negative slope position of the sawtooth 134 and turns off at the time the output 133 is generated by the disc and light source 119. Curve 132 shows the pulses applied to the motor. If at point 137 the load is increased the emitter of the unijunction 143 (see FIG. 9) of the unijunction pulse generator 123 charges at the usual slope to the point where it is clamped at a voltage value less than the value required for firing. Thus, the voltage remains on the motor until the next pulse 139 is received from the speed control 119. When this pulse is received the voltage to the motor and the voltage clamp are removed resulting in the firing of the unijunction which in turn reapplies the voltage to the motor. This continues as indicated during the time period 137–138 until the sawtooth voltage fails to reach the clamping voltage v, associated with curve 134, before the pulse 133 is received. Point 140 of curve 134 illustrates the return to proper speed of the motor. In this manner underspeed compensation is attained.

If at point 138 the load is suddenly reduced the momentum of the motor will result in an overspeed condition. In this condition the motor is prevented from turning on until the voltage on the emitter of transistor 142 reaches the normal triggering level of the unijunction.

Referring now to FIG. 9, an example of the motor control circuits 24 and 25 is shown. The input section receives a signal over lead 127 from the voltage divider 72 or 74 (see FIG. 6). The input section 121 is connected to a constant current section 122, of standard design, the output of which is connected to one side of capacitance 141 and the collector of transistor 142 of the unijunction pulse generator or transistor relaxation oscillator. This circuit 123 uses the constant current capacitor 141 which will start charging when a constant current is applied. When the voltage on the emitter of transistor 143 reaches a particular voltage, the device conducts between points 144 and 145. As a result transistor 142 is turned on, shunting the emitter of the unijunction transistor 143 to ground. In this manner the device is reset permitting the cycle to start again. Transistor 142 provides a discharge path for condensor 141 so that the discharge current does not pass through the emitter of transistor 143. Since the voltage change takes a finite time the low side of capacitor 141 goes negative and a negative pulse is applied through capacitor 146 to momentarily turn off transistor 147. As a result a positive pulse is applied through capacitor 148 to gate the silicon control rectifier 149.

The SCR 149 is a part of the motor drive circuit 126. If a positive pulse appears on lead 150 the SCR 149 turns on applying a positive bias to transistor 151 and in turn to transistor 152. A positive bias applied to the base of transistor 151 results in the motor winding connected to lead 153 from the collector of transistor 151 being grounded through the transistor. In addition, the positive bias applied to the base of transistor 152 inhibits the overspeed circuit 124 through lead 154 and diode 155. The circuit remains on until the anode of the SCR 149 is grounded through lead 156 by the speed indicating circuit 125.

The speed indicating circuit utilizes a photosensitive silicon rectifier 160 which is responsive to either light or a gating current. In this circuit the transistor 161 is used to charge the capacitor 162. When no light reaches the SCR 160 the capacitor 162 is charged through transistor 161 and resistor 163. The effective resistance allows capacitor 162 to charge quickly turning off transistor 164. When light reaches the SCR 160 it is turned on and capacitor 162 discharges through diode 165 and the SCR circuit. The firing of the SCR 160 turns on transistor 166 which, through lead 156, turns off the SCR 149 in the motor drive circuit 126. Also when capacitor 162 discharges, transistor 164 turns off permitting a pulse to be applied over lead 167 to the overspeed circuit 124.

In this manner if a pulse is received from the pulse generator 123 the motor connected to lead 153 is turned on. As soon as the light hits the photosensitive SCR 160 the motor is turned off.

Underspeed control is accomplished by placing a clamp on the emitter 145 of unijunction transistor 143 of pulse generator 123. This clamp is operable whenever the voltage is being applied to the motor. Since the voltage level is just less than the triggering voltage of the unijunction 143, the capacitor 141 can only charge up to that value and therefore transistor 143 will not trigger. This permits the pulse generator 123 to generate a pulse at the output essentially instantaneously after the motor control SCR 149 is turned off, and turns the motor back on to let it reach desired speed more rapidly. This operation requires that the charging current to capacitor 141 be of such a value that it is charged to the clamping voltage prior to the time that a pulse is received from the speed indicating circuit 125 turning off the motor and clamping voltage.

Overspeed control is provided by utilizing transistor 180. The transistor, when turned on, energizes transistor 147 so that it will not turn off from a pulse from the unijunction transistor 143, and also reduces the voltage on base "2," 181, of the transistor 143. As a result the firing voltage of transistor 143 is lowered. This voltage is sufficiently low, however, so that transistor 147 is not thereby turned off. When transistor 147 is turned off the pulse generator 123 must again start its charging cycle. Assuming the motor is running from a previous pulse and the SCR 160 turns off the motor, the turning off of the motor and the turning on of transistor 164 are timed by the turning off of the motor control SCR 149 and the pulse duration from transistor 164 so that the transistor 180 remains off. If another pulse is received from the photosensitive SCR 160 before the next pulse is generated by 123, this pulse will reset the unijunction transistor in the manner described above. The motor is thereby allowed to slow down through an extra cycle before it is again energized. This operation will be repeated until the pulse from the generator 123 is received before the next pulse from the SCR 160 at which time the motor has slowed to the desired speed.

By utilizing such a motor control circuit very precise control is achieved over the fixture movement and wire feed of the welder. Such precise control is essential in order to synchronize all weld operations with the weld current variation and electrode travel movements programmed.

Pulse Generator

The fixture speed motor control 24 (FIG. 9) provides a pulse output at 182 equivalent to about 160 pulses per degree of weld fixture head motion. This pulse source is used through binary counter 27, electrode travel logic 29, time base logic 30 and stepping motor logic 33 to drive a stepping motor 34. The stepping motor 34 drives the carriage 36 across the program and is preferably set so that about 5000 pulses will move the carriage across the entire area 40. In the preferred embodiment each pulse moves the carriage 0.005 inch or 200 pulses are required per inch of carriage travel. Thus, if scale A in area 44 (FIG. 3) of the program 38 is selected the horizontal program scale will be 500 degrees and the pulse output of the motor must be divided by 16 to give full scale carriage movement. In a similar manner, scale B, C and D, i.e., 1000, 1500 and 2000 degrees electrode travel, can be achieved by dividing the pulse rate by 32, 48 and 64, respectively. This scaling down by the appropriate amount is accomplished in the binary counter 27, shown in detail in FIG. 12. The binary counter utilizes six standard flip flop circuits 217–222 connected in series. The pulse train output 182 of the fixture speed motor control 24 is connected to the input of an inverter 223 (FIG. 12) which drives flip flops 217–222. Each of the inputs of flip flops 218–222 are connected through diodes to a reset signal and cycle control input 224, the purpose of which will be apparent from the discussion of those circuits. The outputs of flip flops 220, 221 and 222 correspond to every 16, 32 and 64 pulses, respectively, at the input at 223. If division by 48 is desired the system is altered to generate an output from flip flop 221 every 48 counts. This is accomplished through the use of a NAND gate 225. The NAND gate 225 is operated by an input signal through lead 226 from electrode travel logic circuit 29, as described in detail hereinafter. The other inputs, 227, 228 and 229 to the NAND gate 225 are the output of the divide by eight flip flop 220 and the secondary outputs of the divide by 32 and 64 flip flops 221 and 222, respectively. In this manner an extra 16 counts are added to the flip flop 221 every time flip flops 219, 221 and 222 generate an output, provided the NAND gate 225 is operative. Thus, the flip flop 222 is changed from a divide by 64 to a divide by 48 flip flop. The three outputs 230, 231 and 232 of the binary counter 27 are connected to the electrode travel logic circuit 29, shown in detail in FIG. 13.

Electrode Travel Logic

The electrode travel logic shown in detail in FIG. 13 comprises four resistive type photocells 235–238 which are physically fixed above the spaces A–D adjacent area 44 on the program 38 of FIG. 3. Each photocell has an associated amplifier 239–242 the outputs of which are connected through inverters to the inputs of AND gates 243–246. If none of the scales are selected, i.e., none of the photocells 235–238 are covered and therefore none of the gates 243–246 are turned on, the carriage operation is controlled solely by the time base logic circuit 30 (FIG. 14). If one of the electrode travel scales adjacent area 44 of program 38 is selected then one of the AND gates 243–246 will be operative to pass the pulse signals on one of the leads 230–232 from the binary counter to the NOR circuit 247 which is connected through an inverter to output lead 248.

The outputs of amplifiers 239-242 are also connected to a NAND circuit 249 used as an AND circuit with several inputs. In this arrangement the grounding of any of the inputs will result in the generation of an output signal at lead 250. Thus, a signal at 250 indicates that one of the operating conditions A-D has been preselected on the program.

Time Base Logic

The time base logic circuit 30 is shown in detail in FIG. 14 and has a single photocell 253 connected through a standard amplifier 255 to a time base generator 256, and an input 254 from electrode travel photocell 107 (see FIG. 7) connected through a standard amplifier 257 and inverter 258 to a NAND circuit 259. The purpose of this circuit arrangement is to control the motion of the photocell carriage 36. This is accomplished through the output of the AND gate 260 which is connected through a NOR gate 261 and inverter 262 to output 263 to the stepping motor logic circuit 33.

The AND gate 260 generates an output only if (1) the carriage motion is forward, i.e., left to right, (2) the carriage start circuit is true, and (3) the electrode travel-on is true. The input at 254 from electrode travel photocell 107 determines condition (3), while the input from the carriage start inhibit circuit 268 determines condition (2). The carriage motion condition (1) is determined by the input on lead 269 from the direction and reset circuit 32 (see FIG. 11).

Assuming these three conditions have been met a chain of pulses is generated by the time base generator 256, i.e., a standard pulse generator the pulse rate of which is controlled by photocell 253. The pulse generator 256 generates 66⅔ pulses/sec. when the photocell 253, which is under square "B" in area 43 of program 38, is not covered. If A is covered, there being no photocell under indicia receiving square A in area 43 of program 38, the result is the same as when square B is not covered. If square B is covered so that no light reaches the photocell 253 the oscillator pulse rate is 33⅓ pulses/sec. This selection allows either the 75 second or 150 second basic speed shown on the horizontal time scales on the bottom of the program.

The carriage start circuit 268 must have a true reading before the carriage 36 will start scanning the program 38. The purpose of this circuit is to determine if the an arc has occurred between the welding torch and the work 68. The input 267 from the arc starter circuit 67 indicates the condition of the welding arc. The voltage from the arc starter 67 has the characteristic of being high before the arc is started and dropping to a lower voltage after arc initiation. This voltage is a negative d.c. voltage and is applied to the carriage start inhibit circuit 268 shown in detail in FIG. 18. When this negative input signal from 67 is higher than the breakdown voltage of the zener diode 270 the base voltage of transistor 271 goes negative turning off the current flow through 271. This provides a true signal output at 267 stopping the carriage from moving. Once the arc has been initiated the sensing voltage drops to below the breakdown voltage of the zener 270 and transistor 271 turns on giving a false signal to the inverter 273 and a true signal to both AND gates 260 and 275.

Another condition which must be met in order to obtain an output from AND gate 260 is that the direction flip flop 276 (see FIG. 15) in the direction and reset circuit 32 indicates that the carriage will move in the proper direction. The output of direction circuit 276 indicates a reverse direction until the pre-purge delay 277 has dropped out, as explained in detail hereinafter. When delay 277 has dropped out, flip flop 276 is switched and the output on lead 269 permits the carriage motion to start if all other conditions have been met.

Referring again to FIG. 14, when lead 278 is true, the output of gate 260 is eliminated and the output of gate 275 is made possible, since the true signal on 278 is inverted at 279 and then applied to gate 275. Thus, when gate 260 is closed either gate 275 or gate 280 controls the output at 263.

When gate 275 is operating the output at 263 is a function of degrees of weld head motion rather than time, i.e., the signal is determined by the selection of electrode travel range by means of photocells 235-238 of the electrode travel logic 29 through lead 248. As explained above, four horizontal scales (bottom of program 38) in degrees are provided. If none of the scales A-D of area 44 are selected, i.e., photocells 235-238 are all uncovered, the input to AND gate 260 is automatically true regardless of the condition of the electrode travel on photocell 107. This results in the carriage operating on the time base since gate 275 is turned off. If one of the electrode travel scales A-D of area 44 is selected the condition of both gates 260 and 275 is governed by the photocell 107 and the signal on lead 254. Since the signal on leads 278 and 279 are opposite only one of gates 260 and 275 is operable at a time.

Gate 280 is responsive to the direction and reset circuit 32 through lead 281 and the cycle control circuit 31 through lead 282. The gate 280 is connected to rapid return pulse generator 283 which is connected through gate 280 to the stepping motor logic circuit 33 only when the proper signals are present on both leads 282 and 281. The generator 283 drives the carriage 36 back across the program in response to the change in signals from direction flip flop 276 through lead 281 and a closed cycle start switch 283 (see FIG. 15). When the carriage is returned to the starting position switch 284 in the cycle control circuit 31 is closed and gate 280 is grounded.

Cycle Control, Direction and Reset, Manual Control Circuits

The cycle control circuit 31, direction and reset circuit 32 and manual control circuit 26 are shown in detail in FIG. 15. These circuits provide builtin safety circuits, automatic logic circuit pre-set, automatic pre-purge, automatic weld sequencing and automatic shut down and post purge. The cycle control 31 has an input 116 from limit photocell 108 (see FIG. 7) which is associated with area 51 of program 38 which generates a signal when the program indicated in areas 40 and 41 is ended.

A water flow switch 286 by-passes the cycle stop switch 287 and prevents the system from starting unless actual coolant flow exists in the weld head. This is accomplished by holding the forward direction output signal on lead 269 of direction flip flop 276 false.

A left-hand carriage position switch 284 is wired in series with the start switch 283 thereby preventing cycle start until the limit switch 284 is closed. A right hand limit switch 288 is also provided which automatically shuts the system down when the carriage reaches this point. Upon turning on the power the voltage at 289 pre-sets the direction 276, pre-purge delay 277, cycle start 290 and post purge delay 291 flip flops. Upon closing the cycle start switch 283 the binary counter 27 is pre-set to zero through lead 224 and the pre-purge delay time 277 is initiated. This also causes the output 292 of cycle start flip flop 290 to go false. This signal is inverted at 293 and operates relay 294 which turns on the purge gas supply to prepare the weld environment. The output 292 is also inverted at 295 to remove the voltage previously available through lead 296 to manual control wire feed switch 297 and electrode travel switch 298. In this manner the manual feeding of wire or the manual movement of the electrode is prevented after the cycle start switch has been energized. The output of inverter 299 goes true and also starts the pre-purge delay timer 277. At this time the output of inverter 301 inhibits the post purge delay timer 291 from operating. After a pre-selected delay the pre-purge delay 277 operates to switch both the timer flip flop 300 and direction flip flop 276 by grounding the output 302 of timer 300 and the output 281 of the direction flip flop 276. The timer 300 by means of inverter 303 inhibits the pre-purge timer 277 from recycling. In addition, the output of the post purge delay 291 is inhibited by the output of inverter 304.

The pre-purge and post purge delay circuits 277 and 291 have a pair of photocells 305 and 306 and associated amplifiers 307 and 308 connected to their inputs. These resistive photocells are located in area 47 of the program 38 and are utilized to preselect the amount of purge time by placing indicia over square A or B of area 47.

The cycle stop switch 287 is connected through inverter 309 so that voltage from source 310 is applied to control relay 311 to apply power to the weld power supply 61. The relay 311 has normally open contacts 312 and 313, the former controlling voltage to the weld head oscillator motor 314 and the other connecting voltage supply 315 to the wire feed motor 316 and electrode travel motor 317. Relay contacts 318, 320, 325 and 327, which are normally closed, and contacts 319, 321, 323 and 324, which are normally open, are responsive to control relay 328. Control relay 328 is operative in response to the closing to position A or B of either manual electrode travel switch 297 or manual wire feed switch 298. In both cases the switch is used to position the electrode or the weld wire before automatic operation begins. Contacts 322, 326 and 332 are normally open and are controlled by relays 113, 114 and 115, respectively, of FIG. 7 which in turn are responsive to photocells 105, 106 and 107 which scan areas 48, 49 and 50, respectively, or program 38.

When switch 298 is in either position A or B the control relay 328 is activated resulting in contacts 318, 320, 325 and 327 being opened and contacts 319, 321, 323 and 324 being closed. When contacts 171-172 and 173-174 are connected by switch 298 the voltage polarity on wire feed motor 316 is reversed from that of position 175-176 and 177-178 to allow proper initial positioning. In a similar manner when contacts 183-184 and 187-188 are connected by switch 297 the voltage polarity on the electrode travel motor 317 is reversed from that when 185-186 and 189-190 are connected.

Output leads 330 and 331 corresponding to the output 153 of the motor control circuit (see FIG. 9) are provided for each of the wire feed and fixture speed motors. The wire feed motor 316 during welding operation is isolated by open contacts 319, 321, 313 and 324 (all on control relay 328) from the switches 297-298 and is isolated from the motor control circuit of FIG. 9 only by contact 326. Relay contact 326 is controlled by relay 114 which will be closed as soon as the photocell 106 (see FIG. 7) indicates the presence of an indicia in the area 49 of FIG. 3. In a similar manner the electrode travel motor 317 is isolated from the control circuit of FIG. 9 by contact 332 which is controlled by relay 115 (see FIG. 7). Relay contact 332 is normally open and will close when indicia is detected by photocell 107 in the area 50 of the program of FIG. 3. The weld head oscillator motor 314 is similarly isolated from a voltage supply 310 by contacts 312 and 322. Contact 312 is closed by control relay 294 while contact 322 is closed by relay 113 in response to the presence of indicia in area 48 being detected by photocell 105.

Stepping Motor Logic

The stepping motor logic circuit is shown in detail in FIG. 16 together with the windings of the stepping motor 34 which drives the carriage 36 across the program 38. The carriage 36 is composed of a vertical bar containing photocells as described in detail above and must move across the program in a precise manner so that the correct motor speeds and weld currents are provided to the welder at the proper time or at the proper angular position of the electrode. It should be noted, however, that it is within the purview of the present invention to move all or portions of the program with respect to the indicia detectors if desired.

Thus, the carriage may be operated in either the time base operating mode through gate 260 of the time base logic circuit 30, FIG. 14, or in the "degree" or rotational travel operating mode through gate 275. In either event the output at 263 is a series of pulses either time based or degree based.

The carriage position is controlled by the stepping motor 34 which has its output geared such that 200 steps is equal to one inch of travel. Internally the motor has four operating coils 352-355 which, when pulsed in preselected sequence, will control the direction of motor rotation and carriage travel. The speed of the motor is a function of the pulse frequency at 263. The stepping motor logic circuit of FIG. 16 controls the sequence of applying these pulses to the motor coils.

The logic circuit 33 converts the input series of pulses into separate pulse commands for each motor coil. These motor pulses are phased so that the motor 34 will rotate 1.8 degress for each input pulse. Thus, 200 steps are required for one resolution of the motor 34.

Flip flops 334 and 335 are connected as binary counters to provide divide by 2 outputs at 336 and 337 and divide by four outputs at 338 and 339. The outputs are connected to a series of eight gates 340-347 so as to provide four separate outputs. Each output comprises a train of pulses which are inverted and current amplified into pulse commands at points 348-351 to step the motor sequentially. The outputs 269 and 281 of the direction flip flop 276 of the direction and reset circuit of FIG. 15 are connected to gate 345, 347 and 344, 346, respectively, to alter the pulse command sequences to provide both clockwise and counter clockwise rotation of the stepping motor 34.

FIG. 19 shows the pulse levels at points 263, 336-339 and 348-351 on FIG. 16. Points 348-351 reflect the pulse commands to the coils 352-355. In all cases zero volts to the coil is a clockwise direction that relationship between the steps 1-4 and the point 348-351 is as shown in Table I.

TABLE I

Points

| Step | 348 | 349 | 350 | 351 |
|---|---|---|---|---|
| 1 | on | off | off | on |
| 2 | off | on | off | on |
| 3 | off | on | on | off |
| 4 | on | off | on | off |
| 1 | on | off | off | on |

The time sequences at points 348-351 for reverse travel are the same as shown in FIG. 19 except that the voltage levels at points 350 and 351 are interchanged. In the case of reverse logic, counter clockwise direction Table II shows the step and point relationship.

TABLE II

Points

| Step | 348 | 349 | 350 | 351 |
|---|---|---|---|---|
| 1 | on | off | on | off |
| 2 | off | on | on | off |
| 3 | off | on | off | on |
| 4 | on | off | off | on |
| 1 | on | off | on | off |

In this manner the stepping motor is precisely controlled so that the actual welding current, fixture speed and wire speed correspond to that programmed on program 38 at each point along the horizontal scale whether the selected scale degrees of electrode rotation for cylinder welding or seconds of time.

OPERATION

In operation a program 38 (see FIG. 3) is positioned in a preset relation on the illuminated glass table 35. Ordinarily the program will have a current vs. degree (or time) curve 191 in area 40, a fixture speed-wire speed curve 192 in area 41, and various indicia 193-196 associated with on-off program areas 48-51. In addition, control conditions will have been selected by placing indicia over appropriate squares associated with areas 42-47. In the particular program illustrated in FIG. 3, the current scale B, at 197 and providing a range of 0-150 amps, is selected. Placing an indicia over current scale selecting square B results in control relay 58 (FIG. 4) being energized so the resistor 50 is placed in the load of constant current device 55. In this manner the weld power supply, FIG. 5, is preset to provide the selected range of amperages to the arc.

No electrode time base was selected in area 43, however, the circuit automatically starts operating on the 150 second time base. The carriage must always be started on time base operation and may then be changed to electrode travel base operation only after the initiation of the electrode travel motor by indicia 195 in area 50 of the program. At that time operation on the time base is terminated and the electrode travel base is operative to control the system.

Thus, square B at 198 is covered resulting in the 1–1000 degree range being selected and in the generation of an output from amplifier 241, FIG. 13. This output will energize gate 245 so that pulse signals on lead 231 from the binary counter 27 will be applied through lead 243 to the stepping motor logic input at 263 (FIG. 16). It should also be noted that since an output will be generated at 250 (FIG. 13) the output of NAND 259 (FIG. 14) will disable gates 260 so that the only signal applied to NOR gate 261 will be the output of the electrode travel logic circuit at 248. The fixture speed and wire speed selection are made as at 199 and 200. In this case the range selections 0–1.6 rpm and 0–12.4 in/min., respectively, allow a straight program indicia 192 to be utilized. Placing opaque indicia over fixture speed selecting square 199 results in control relay 78 (FIG. 6) operating to connect resistance 83 as the load on constant current source 70 so that a signal is applied to motor control 24 representing this selection. Similarly, placing opaque indicia over wire feed square 200 results in control relay 92 connecting resistance 99 between the output of 71 and ground so that a signal is applied to wire feed motor control representing this selection. Purge time square A, 201 representing a 10 second purge time, is selected thereby causing an output to be generated by amplifier 307, FIG. 15, which sets the delays 277 and 291.

Assuming the system has been reset and that the carriage is in the left hand position, start switch 283 (FIG. 15) is closed and the output on lead 292 of cycle start flip flop 290 starts the prepurge cycle as explained above and the binary counter is reset and the carriage will start to move.

As the carriage 36 starts to move across the program the curve 191 to detected by an array of photocells and the signal at 54 (see FIG. 4) changes in response to the location of the opaque indicia. This signal is applied to the welder which is responsive to increase the current until it reaches a value of about 100 amps. Note that no welding operations have yet taken place in this example. At the time of maximum current 202 the array of photocells scanning area 41 detect indicia 192 generating a signal at the input of constant current source 70 (FIG. 6) and resulting in fixture speed motor control 24 and wire feed motor control 25 generating an output voltage over respective leads 153 (FIG. 9). However, this voltage can not be applied to the wire feed motor 316 and electrode travel motor 317 (FIG. 15) until relay contacts 326 and 332, respectively, are closed. Relay contact 326 is controlled by control relay 114 (FIG. 7) of the wire feed on-off control having photocell 106 scanning area 49 of the program while relay contact 332 is controlled by control relay 115 of the electrode travel on-off control having photocell 107 scanning area 50 of the program. Thus, neither wire feed nor fixture movement starts when indicia 192 is initially detected.

In the illustrated program during the first electrode rotation, 202 to 203, about the work a first weld is made without the wire feed motor being energized. At point 202 photocell 107 (FIG. 7) detects indicia 195 in area 50. As a result relay 115 is activated and contact 332 is closed so that electrode travel motor 317 is connected to a voltage source and starts to operate. At point 203 the wire feed motor is programmed by indicia 194 to start operating and during the second pass around the work, 203 to 204, wire will be added to the weld. The current will be reduced at point 203 to account for the fact that the work had previously been heated at the first pass. While two passes may be utilized as illustrated, it is clear that only a single pass may be desirable. More specifically, after the first pass the current is reduced and the individual photocells 105 and 106 (FIG. 7) scanning areas 48 and 49 of the program detect the start of indicia 193 and 194, respectively. As a result control relays 113 and 114 are activated and relay contact 326 (FIG. 15) is closed so that wire feed motor 316 is connected to a voltage source and starts operation. In addition, contact 322 is closed and, since contact 312 on control relay 294 has already been closed by the application of a signal from the cycle start flip flop 290, the oscillator motor is energized to slowly oscillate over a very small path the welding electrode. This small oscillation has been found to materially improve the weld quality.

Welding of the pipe work piece started at point 202 with the electrode travel motor initiation and stops when the indicia 194 in area 49 terminates. At about this same time the weld current is rapidly reduced from its peak 204 at a rate consistent with good welding practices.

The program limit is indicated by the initial edge of indicia 196 located in the program limit area 51. This area is scanned by photocell 108, which through lead 116, applies a signal to the cycle control circuit 15 which results in the output 269 of the direction flip flop 276 being grounded causing it to reverse direction. The output of inverter 304 changes permitting the post purge delay 291 to operate. After a preselected amount of delay the output of the post purge delay 291 changes, switching the cycle start flip flop 270 and de-energizing control relay 294. This also switches the timer flip flop 300 thereby placing all flip flops back in their original positions. At the same time gate 280 gates the rapid pulse return generator 283 to the output 263 of the time base logic circuit which drives the stepping motor 34 backwards to return the carriage to the left hand starting position.

The foregoing description was directed to an embodiment of a programmer adapted for controlling a weld on a pipe made by an arc welder of the orbital type. While this embodiment was specific to a particular welding operation, it is clear from the description that other types of welders or material handling systems may be used in conjunction with the programmer of the present invention. In addition, acetylene or other gas welding apparatus could be used and gas mixtures and quantity controlled in place of current control in the preferred embodiment.

It is also apparent that the program or parts of it could be moved relative to the scanner so that less surface area would have to be used to illuminate the program sheet. It is also clear from the above example that a number of variations in program directed operation may be made. For example, wire feed may be increased or decreased during the program to allow for the welding of thicker or thinner work sections. Furthermore, the description of an orbital arc welder operation is only an example and all other types of welding may be accomplished utilizing the programmer of the present invention. Thus, the programmer of the present invention could be utilized with one of the well-known weld path guides, i.e., separate graphs or work edge monitoring, which are well-known in the art for linear welding movements.

The present invention is not limited to the specific details of the particular embodiments described, since many modifications will be apparent to those skilled in the art, the scope of the present invention being limited only by the appended claims.

We claim:

1. A programming system for operating in a prescribed manner an automatic welder having a fixture, a welding material feed and weld heat generating means comprising first means including a sheet program having a plurality of indicia thereon for defining multiple operating parameters for welding, second means for monitoring said program and generating signals representing said parameters, third means for controlling the feeding of weld material and the movement of the weld fixture, fourth means for controlling the generation of weld heat, said third and fourth means being responsive to said second means, and fifth means responsive to said signals generated by said second means and to said third means for controlling the monitoring of said second means.

2. The programming system of claim 1 wherein said first means includes a flexible sheet program having indicia representing changes in various process parameters.

3. The programming system of claim 2 wherein said sheet is translucent and said indicia are opaque and wherein said second means includes a plurality of photocells for scanning a selected portion of said program, said photocells being responsive to said opaque indicia to generate said signal.

4. The programming system of claim 1 wherein said first means includes means for illuminating said program, said program being a flexible, removable, translucent sheet and said indicia being opaque elements contained on said sheet, and wherein said second means includes means for scanning multiple selected portions of said sheet, said scanning means including a plurality of photocells for detecting the location of a portion of said indicia on said sheet and generating a signal in response to said detection.

5. The programming system of claim 4 wherein one part of said scanning means and said program are moved relative to each other.

6. The programming system of claim 5 wherein said scanning means includes a fixed part having a plurality of fixed photocells for detecting the presence of indicia on another part of said sheet.

7. The programming system of claim 1 wherein said second means includes scanning means for scanning selected portions of said program and wherein said scanning means has a fixed part and a movable part, said movable part including a plurality of photocells for detecting indicia on one portion of said sheet program, said photocells being moved relative to said sheet program, and wherein said fifth means controls said relative movement.

8. The programming system of claim 1 wherein said third means includes a motor regulator means responsive to said parameter signals for generating a plurality of regulating signals, said third means also including a plurality of motorized drive speed control means, each of said control means being responsive to one of said regulating signals.

9. A programming system for operating in a prescribed manner a welder having a fixture, weld material feed and heat generating means comprising first means including a program sheet having indicia positioned thereon to define multiple operating parameters for welding, second means for monitoring said program and the presence of said indicia and generating operating signals responsive to the location of said indicia on said program, said second means including scanning means for sequentially monitoring at least one area of said program sheet for indicia and generating at least one operating mode signal, said second means also including fixed means for monitoring at least one other area of said program sheet for indicia and generating at least one control condition signal, third means for controlling the feeding of weld material to the weld fixture and for controlling the movement of the weld fixture responsive to said at least one operating mode signal, fourth means for controlling the weld heat generating means of the welder in response to said at least one operating mode signal, and fifth means responsive to said fourth means and to at least one operating condition signal for controlling said second means.

10. The programming system of claim 9 wherein said scanning means has a movable carriage and includes a stepping motor for driving said carriage across said at least one area, and wherein said fifth means includes logic means for pulsing said stepping motor in a prescribed manner.

11. The programming system of claim 10 wherein said logic means includes a timing signal, means responsive to said timing signal and one of said control condition signals for generating a series of output pulses, stepping motor logic means responsive to said series of output pulses and to a carriage direction control means for driving said stepping motor in a predetermined direction and at a predetermined speed.

12. A programming system for operating a welder in a prescribed manner comprising first means including a program having a plurality of indicia for defining operating parameters, second means for scanning one portion of said indicia and generating operating mode signals, third means for monitoring another portion of said indicia and generating operating condition signals, welding means including weld material feed means, weld fixture moving means and weld heat generating means, fourth means responsive to at least one of said mode signals for controlling said weld heat generating means, fifth means responsive to at least one other of said mode signals for controlling said feed means and sixth means responsive to at least one other mode signal for controlling said weld fixture moving means, and logic means for synchronizing the sequential monitoring of said second means in response to said operating mode and operating condition signals.

13. A programming system of claim 12 wherein said sixth means includes a pulse generator, and wherein said logic means includes a binary counter responsive to said pulse generator and to a plurality of operating mode signals to generate an output signal, means responsive to said output signal for driving said second means.

14. A programming system for the automatic operation of an arc welder having a movable electrode, a wire feed source and a weld current source associated with said electrode, comprising first means including a program having a plurality of indicia for defining operating parameters, second means including scanning means for monitoring the position of one portion of said indicia and generating a plurality of operating mode signals dependent upon the indicia position, said mode signals representing programmed electrode travel, wire feed speed and weld current variables, third means for monitoring another portion of said indicia and generating a plurality of operating condition signals representing the range of values said mode signals may represent, fixture speed control means responsive to one of said mode signals for moving said electrode in a programmed manner, wire feed control means responsive to one of said mode signals for feeding wire to said weld electrode in a programmed manner, and weld current control means for controlling the current supplied to said electrode in a programmed manner, logic means including pulse generating means for generating a series of pulses, stepping motor means for driving said scanning means, said logic means including means for applying said series of pulses to said stepping motor in any one of a plurality of modes to control the direction and speed of said stepping motor operation.

15. The programming system of claim 14 wherein said second means includes means for scanning a plurality of indicia containing areas, one of said areas having indicia representing desired current variations as a function of electrode position, a second area representing variation in fixture speed and wire feed as a function of electrode position, and a third area having indicia representing on-off control of said electrode movement and said wire feed speed, said plurality of operating mode signals including signals having values varying in accordance with the changes in indicia in said first, second and third areas.

16. The programming system of claim 14 wherein said third means includes a plurality of indicia representing range selections for a plurality of variables including the said mode signal variables, said third means including a plurality of detecting means responsive to said indicia for generating operating condition signals.

17. The programming system of claim 12 wherein said scanning means includes a plurality of photocells supported on a carriage adapted to be moved across said program by said stepping motor means.

18. The programming system of claim 12 wherein said third means includes a plurality of fixed photocells supported adjacent said program for detecting said another portion of said indicia.

19. The programming system of claim 12 wherein said pulse generating means generates a train of pulses in response to the energization of said electrode travel speed control means by one of said operating mode signals, and wherein said logic means includes a binary counter responsive to an operating condition signal for generating a series of pulses, and stepping motor logic means responsive to said series of pulses and a plurality of operating signals for driving said stepping motor means.

20. A programming system for operating in a prescribed manner an automatic welder having a fixture and weld heat generating means comprising:

first means including a sheet program having a plurality of indicia thereon for defining multiple operating parameters for welding, second means for monitoring said program and generating signals representing said parameters, third means for controlling the movement of the weld fixture, fourth means for controlling the generation of weld heat, said third and fourth means being responsive to said second means, and fifth means responsive to said signals generated by said second means and to said third means for controlling the monitoring of said second means.

21. The programming system of claim 20, wherein said first means includes a flexible sheet program having indicia representing changes in various process parameters.

22. The programming system of claim 21, wherein said sheet is translucent and said indicia are opaque and wherein said second means includes a plurality of photocells for scanning a selected portion of said program, said photocells being responsive to said opaque indicia to generate said signal.

* * * * *

UNITED STATES PATENT OFFICE
CERTIFICATE OF CORRECTION

Patent No. 3,657,511      Dated April 18, 1972

Inventor(s) Robert Friedman et al

It is certified that error appears in the above-identified patent and that said Letters Patent are hereby corrected as shown below:

On the cover sheet [73] the name of the assignee should read -- North American Rockwell Corporation --.

Signed and sealed this 7th day of November 1972.

(SEAL)
Attest:

EDWARD M. FLETCHER, JR.
Attesting Officer

ROBERT GOTTSCHALK
Commissioner of Patents